US008888595B2

(12) United States Patent
Gregory et al.

(10) Patent No.: US 8,888,595 B2
(45) Date of Patent: Nov. 18, 2014

(54) INDUCING FORCE INTO A NON-ANCHORED GAMING DEVICE

(75) Inventors: Sherman A. Gregory, San Diego, CA (US); Thomas E. Kilpatrick, II, San Diego, CA (US); Patrik N. Lundqvist, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 13/094,008

(22) Filed: Apr. 26, 2011

(65) Prior Publication Data

US 2012/0052951 A1     Mar. 1, 2012

Related U.S. Application Data

(63) Continuation-in-part of application No. 12/862,482, filed on Aug. 24, 2010.

(51) Int. Cl.
*G07F 17/34*     (2006.01)
*A63F 13/20*     (2014.01)

(52) U.S. Cl.
CPC ......... *A63F 13/06* (2013.01); *A63F 2300/1037* (2013.01); *A63F 2300/1043* (2013.01)
USPC ................................. 463/37; 463/36; 463/38

(58) Field of Classification Search
USPC .............................................. 463/36, 37, 38
See application file for complete search history.

(56) References Cited

U.S. PATENT DOCUMENTS

| | | | |
|---|---|---|---|
| 5,136,194 A | 8/1992 | Oudet et al. | |
| 6,236,125 B1 | 5/2001 | Oudet et al. | |
| 7,528,561 B2 | 5/2009 | Kawai et al. | |
| 7,906,877 B2 | 3/2011 | Okada et al. | |
| 7,969,069 B2 | 6/2011 | Pellegrini | |
| 8,205,497 B1* | 6/2012 | Okandan et al. | ............ 73/514.26 |
| 2006/0290662 A1 | 12/2006 | Houston et al. | |
| 2007/0282564 A1* | 12/2007 | Sprague et al. | ............... 702/141 |
| 2008/0001484 A1 | 1/2008 | Fuller et al. | |
| 2008/0174787 A1 | 7/2008 | Teo et al. | |
| 2008/0246352 A1 | 10/2008 | Iwasa et al. | |
| 2011/0111849 A1* | 5/2011 | Sprague et al. | .................. 463/31 |
| 2011/0121953 A1* | 5/2011 | Grant et al. | ................ 340/407.1 |
| 2012/0049659 A1 | 3/2012 | Gregory et al. | |
| 2012/0248887 A1* | 10/2012 | Kesler et al. | ................... 307/104 |
| 2012/0256494 A1* | 10/2012 | Kesler et al. | ................... 307/104 |

FOREIGN PATENT DOCUMENTS

| | | | |
|---|---|---|---|
| JP | H06113522 A | 4/1994 | |
| JP | 2000262032 A | 9/2000 | |

(Continued)

OTHER PUBLICATIONS

International Search Report and Written Opinion—PCT/US2011/048991—ISA/EPO—Nov. 15, 2011.

*Primary Examiner* — Pierre E Elisca
(74) *Attorney, Agent, or Firm* — Jeffrey D. Jacobs

(57) ABSTRACT

Force feedback in a gaming controller is provided by a motion induction device having an untethered mass. The mass is accelerated and decelerated to provide directional force feedback to a user of the gaming controller. The forces may be applied in a game controller shaped to simulate a tennis racquet, baseball bat, gun, steering wheel, or golf club. A sensor may be included in the game controller to provide information for adapting the force feedback. For example, in a game controller simulating a golf club an accelerometer may measure the speed and motion of the golf club, and the game controller provides force feedback through the motion induction device to simulate impact with a golf club or train a user to swing in a desired motion.

20 Claims, 17 Drawing Sheets

(56) References Cited

FOREIGN PATENT DOCUMENTS

| JP | 2004079639 | A | 3/2004 |
|----|------------|---|--------|
| JP | 2008180652 | A | 8/2008 |
| JP | 2008546534 | A | 12/2008 |
| JP | 2009240126 | A | 10/2009 |
| JP | 2010068690 | A | 3/2010 |
| WO | WO-2007002775 | A2 | 1/2007 |

* cited by examiner

INDUCING FORCE INTO A NON-ANCHORED GAMING DEVICE

CROSS REFERENCE TO RELATED APPLICATION

This application is a continuation-in-part of U.S. patent application Ser. No. 12/862,482 filed Aug. 24, 2010, in the names of GREGORY et al., the disclosure of which is expressly incorporated by reference in its entirety.

TECHNICAL FIELD

The present disclosure relates to motion induction, and more particularly, to motion induction in gaming devices.

BACKGROUND

Gaming devices are becoming more effective simulators with realistic user interfaces and graphics. However, tactile feedback provided to the user through game controllers has not changed much. Conventionally, game controllers include a vibration motor for providing tactile feedback to the user. For example, if a car simulator is being played, the game controller may vibrate when a user's car contacts another object. However, the vibration motor is limited in bandwidth and can provide only a single type of tactile feedback.

BRIEF SUMMARY

A gaming controller has a chassis, and a motion induction device fixedly coupled to the chassis. The motion induction device provides force feedback for the gaming controller. The game controller also has a magnetic element movably positioned within the motion induction device. The magnetic element is movable along a first axis of the motion induction device. The game controller also has at least one conducting coil wrapped around the motion induction device; and a current control block coupled to the at least one conducting coil. The current control block is configurable to generate current through the conducting coil(s) to move the magnetic element along the first axis.

A method includes generating a current in a coil wrapped around an enclosure. The enclosure has a magnetic element movable along a first axis of the enclosure. The current causes the magnetic element to accelerate along the first axis away from an initial position to provide force feedback in a gaming controller to simulate an event. The method also includes, subsequent to generating the current, causing the magnetic element to move back toward the initial position along the first axis.

A gaming controller has a chassis and means for accelerating an untethered mass. The accelerating means is fixedly coupled to the chassis. The acceleration means provides force feedback for the gaming controller.

A computer readable medium tangibly stores a computer program for a game controller and has a sensing code segment that receives information from the game controller. The program also has a force feedback code segment that instructs force feedback in a motion induction device of the game controller based on the received information.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
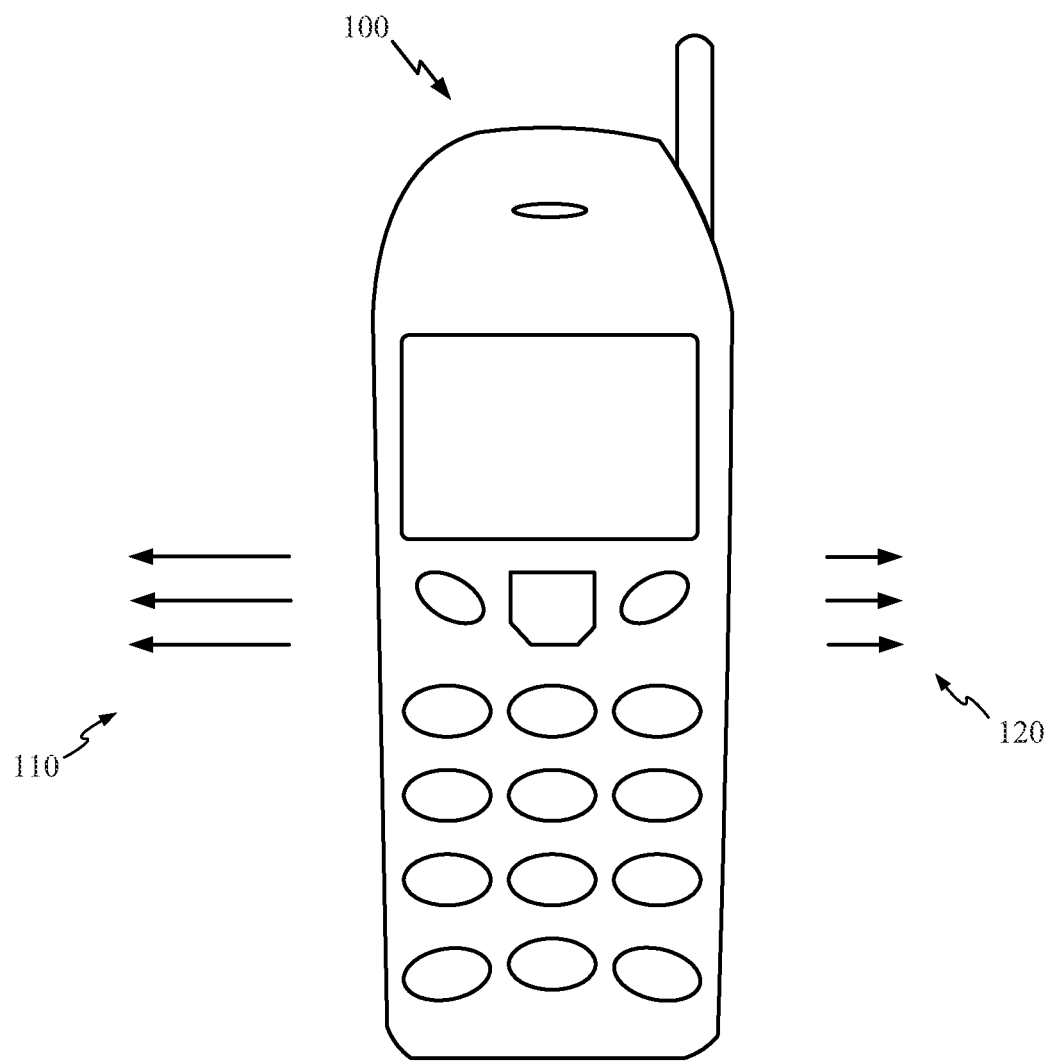
FIG. 1 illustrates an exemplary embodiment of a handheld device incorporating force induction techniques of the present disclosure.

FIG. 1 illustrates an exemplary embodiment of a handheld device 100 incorporating force induction techniques of the present disclosure. In FIG. 1, the handheld device 100 is shown as a mobile phone. One of ordinary skill in the art will appreciate that a handheld device of the present disclosure need not be a mobile phone, and may generally be any type of handheld device, e.g., a personal digital assistant (PDA), a personal navigation device, smart phone, etc. Such alternative exemplary embodiments are contemplated to be within the scope of the present disclosure.

According to the present disclosure, the handheld device 100 is configurable to generate a force impulse that is tactilely and/or kinesthetically perceptible to a user (not shown in FIG. 1) of the handheld device 100. Such physical impulses may be useful when other visual or audible indications are less effective due to, e.g., physical restrictions of the environment, or physical impairments of the user. The impulses could also be supplemental to visual and/or audible indicators. In FIG. 1, the handheld device 100 may generate, e.g., one or more sharp physical impulses 110, or "knocks," to the left side of the handheld device 100 that are tactilely perceptible to a user. Similarly, the handheld device may generate similar knocks 120 to the right side of the handheld device 100. In an exemplary embodiment, a left knock 110 may signal the left direction to the user of the handheld device 100, while a right knock 120 may signal the direction to the right. In alternative exemplary embodiments, it will be appreciated that directional impulses to the right, top, bottom, front, back, or any local portion of the handheld device 100 may be similarly generated and felt by the user.

Figure 1A:
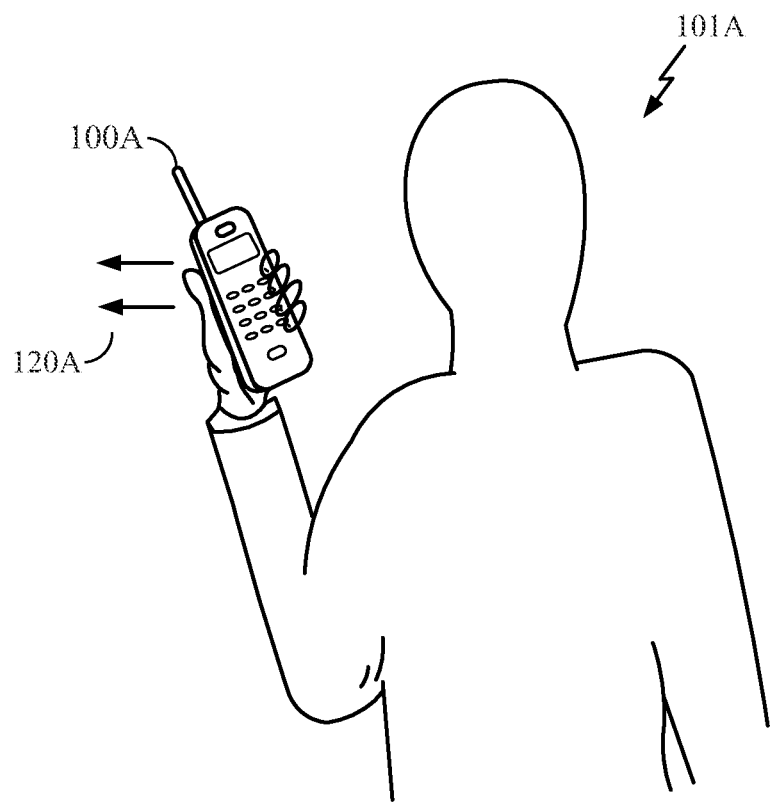
FIG. 1A illustrates an exemplary embodiment of the present disclosure in a handheld personal navigational device according to the present disclosure.

FIG. 1A illustrates an exemplary embodiment of the present disclosure in a handheld personal navigational device 100A according to the present disclosure. Note FIG. 1A is shown for illustrative purposes only, and is not meant to limit the scope of the present disclosure to navigational devices. In FIG. 1A, the device 100A is configured as a personal navigational device that determines a target location specified by the user 101A relative to a present location of the user 101A. It will be appreciated that the determination of present and target locations by a navigational device is known in the art, and may utilize, e.g., satellite signals from the global positioning system (GPS). To guide the user 101A to the target location, the device 100A may generate one or more knocks or directional impulses to a side of the device 100A, as illustrated by 120A in FIG. 1A. In the exemplary embodiment shown in FIG. 1A, the knocks 120A are generated to the left side of the device 100A to indicate that the user should proceed to the left to reach a target location.

Figure 2:
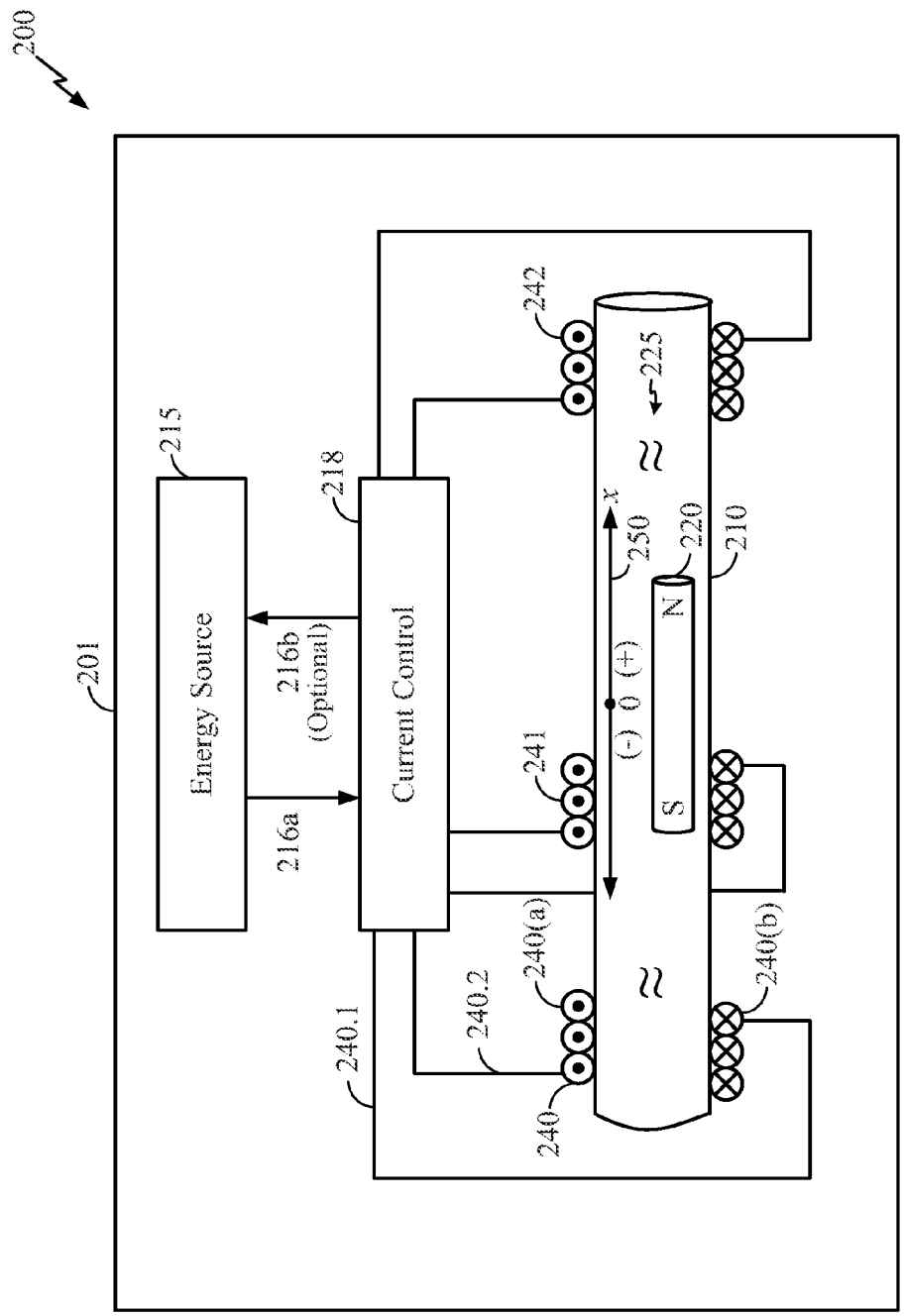
FIG. 2 illustrates an exemplary embodiment of a mechanism for generating tactilely perceptible physical impulses using motion induction techniques according to the present disclosure.

FIG. 2 illustrates an exemplary embodiment 200 of a mechanism for generating tactilely perceptible physical impulses using force induction techniques according to the present disclosure. In FIG. 2, a chassis 201 is provided on which the components of the mechanism 200 may be mounted. The chassis 201 may be, e.g., a physical chassis of a handheld device 100 as shown in FIG. 1. Alternatively, the chassis 201 may in turn be mounted on a separate chassis of the handheld device 100.

The chassis 201 is coupled to a fixed mechanical support 210, which is shown as a hollow tube in FIG. 2. The tube 210 is hollow along an ordinate axis 250 (also denoted herein as a "first axis"). A magnetic element 220 having a north pole (N) and a south pole (S) may be present inside the tube 210. In an exemplary embodiment, the inside of the tube 210 may include a vacuum, and the magnetic element 220 may be constrained to move along the axis 250. In FIG. 2, the variable x may describe the net lateral displacement of the center of the magnetic element 220 relative to a center of the tube 210 along the axis 250, with the center of the tube 210 corresponding to x=0. One of ordinary skill in the art will appreciate that the ordinate axis 250 is shown for descriptive purposes only, and is not meant to limit the scope of the present disclosure. For example, in alternative exemplary embodiments, the center of the ordinate axis may reference any arbitrary point on the tube 210.

In an exemplary embodiment, the interior of the tube 210 may be lined with a low-friction material, e.g., PTFE or "Teflon," or lined with a lubricant. Wound around the tube 210 are one or more sets of electrically conducting wound coils, three coils 240, 241, 242 of which are shown in cross-section in FIG. 2. Description of the first coil 240 is given hereinbelow; it will be appreciated that similar description may apply to coils 241, 242, and any other number of coils in alternative exemplary embodiments.

The first coil 240 is wound at least once, and preferably many times, around the tube 210. First 240.1 and second 240.2 ends of the first coil 240 are coupled to a current control block 218. Current flow is shown in FIG. 2 with 240(a) representing current flow into the plane of the cross section, and 240(b) representing current flow out of the plane of the cross section. Block 218 controls the current flowing through the first coil 240. Coils 241 and 242 similarly have ends coupled to block 218, and may support current generated by block 218. Block 218 is in turn coupled to an energy source 215. The energy source 215 may supply the energy to generate current through any of the coils 240, 241, 242 through the current control block 218. In certain exemplary embodiments, the energy source 215 may also store energy generated from the coils 240, 241, 242, e.g., as further described with reference to FIG. 5 hereinbelow.

Figure 3A:
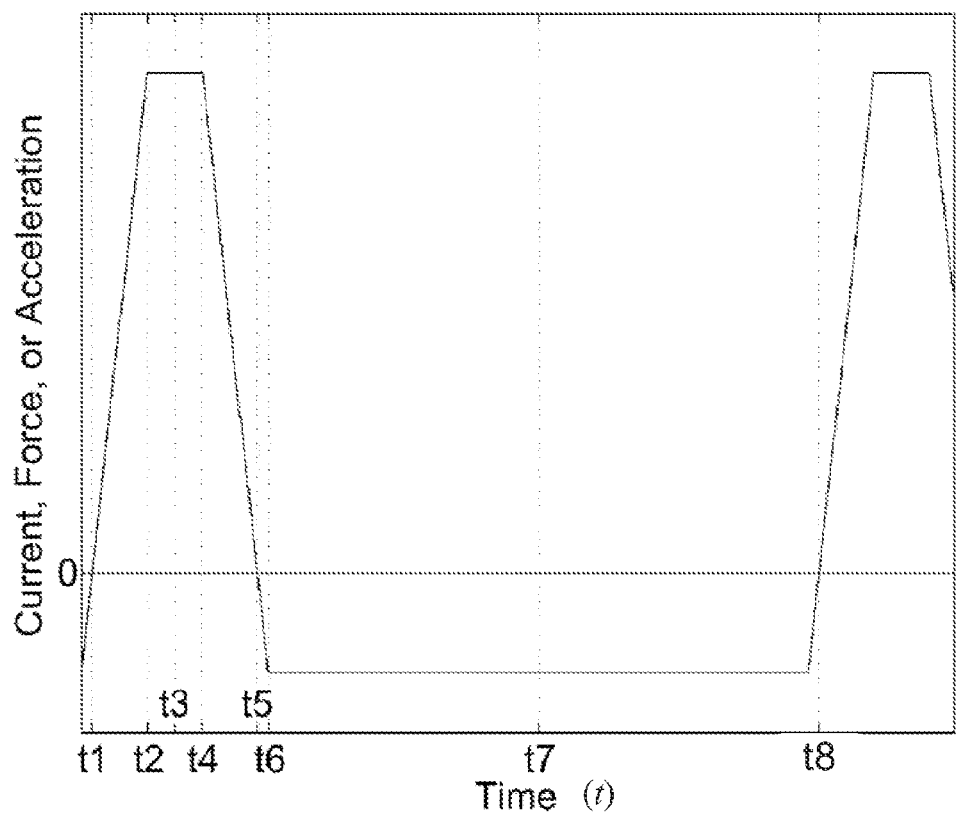
FIGS. 3A, 3B, and 3C illustrate exemplary current, displacement, and velocity profiles for the mechanism of FIG. 2.
Figure 3B:
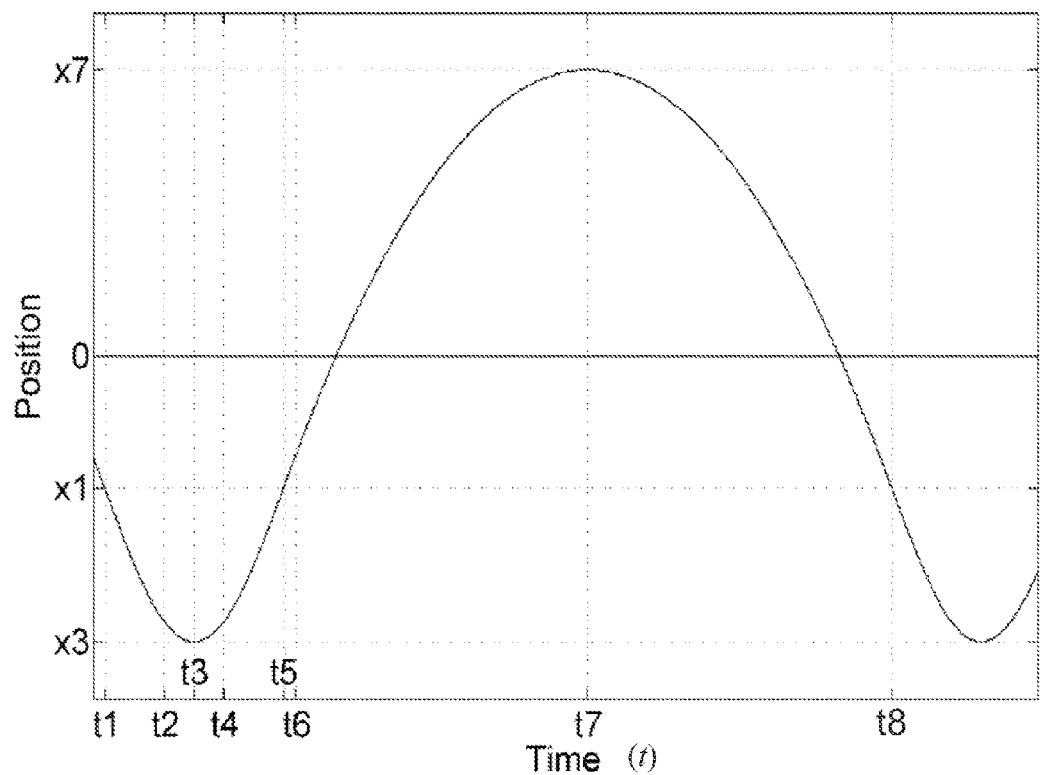
Figure 3C:
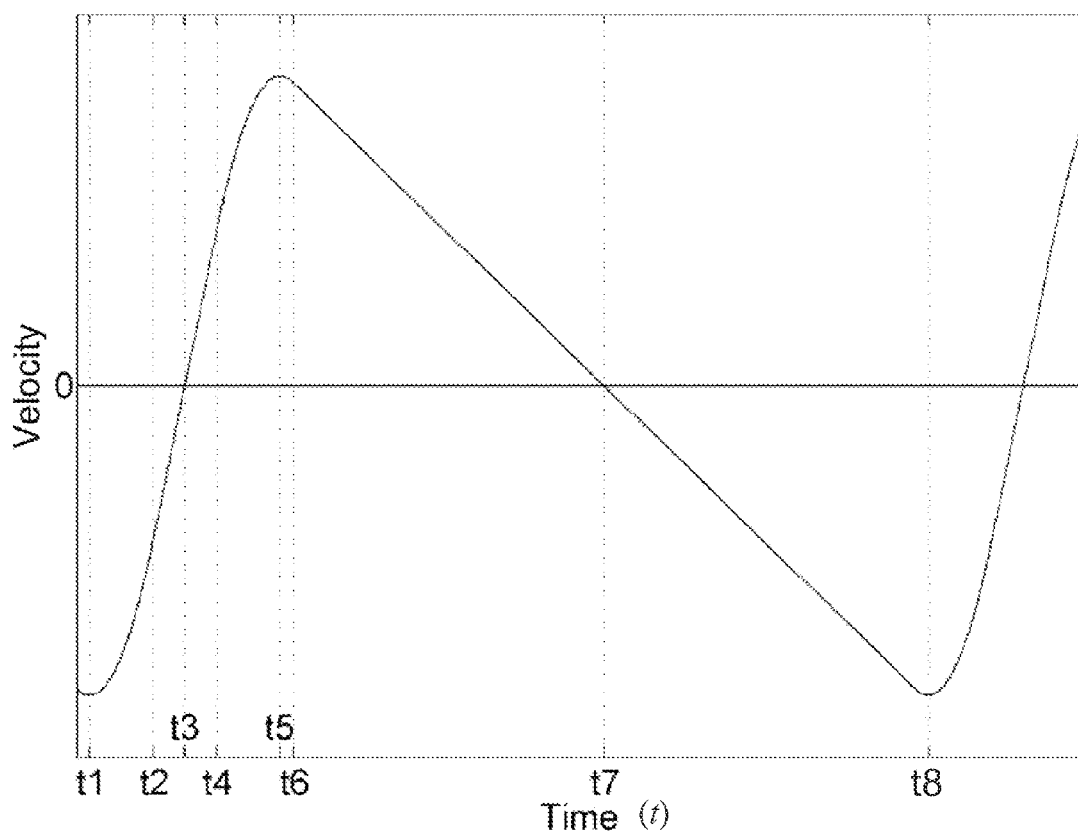

FIGS. 3A, 3B, and 3C illustrate exemplary current, displacement, and velocity profiles, respectively, for the mechanism 200 of FIG. 2. In particular, FIG. 3A illustrates a plot of current through one or more of the coils 240, 241, 242 versus time (t), showing the progression of time from left to right along the horizontal axis. It will be appreciated that as current, force, and acceleration are expected to be proportional to one another, they are shown on a single vertical axis for simplicity. In FIGS. 3B and 3C, the displacement and velocity, respectively, of the magnetic element 220 are plotted versus time (t), assuming the corresponding current is as shown in FIG. 3A. It will be appreciated that FIGS. 3A, 3B, and 3C are shown for illustrative purposes only, and are not meant to limit the scope of the present disclosure to any particular current, displacement or velocity profiles shown.

Arbitrarily fixing t=t1 as corresponding to an "initial" time, it can be seen from FIG. 3B that the magnetic element 220 is initially positioned at x=x1, which lies to the left of the center x=0 of the tube 210. Furthermore, FIG. 3C shows that the magnetic element 220 is initially moving with negative velocity (i.e., in the negative x direction, or to the left of the tube with reference to FIG. 2) at time t=t1.

Referring to the current profile in FIG. 3A, from time t=t1 to t=t5, a positive current is present in the coil, and may be generated by the current control block 218. It will be appreciated that a net current through the coil as exists between t=t1 and t=t5 will generate a magnetic field in the tube 210, which thereby generates a force and corresponding positive acceleration on the magnetic element 220. Consequently, the velocity of the magnetic element 220 is seen to increase in FIG. 3C, while the displacement of the magnetic element 220 is shown to change as shown in FIG. 3B. In particular, in FIG. 3B, the magnetic element 220 is seen to travel from x=x1 at t=t1 to a leftmost extreme of x=x3 at t=t3, whereupon the magnetic element 220 reverses direction and begins traveling in the positive x direction starting at t=t3, and continues to accelerate in the positive x direction until t=t5. During the time t=t1 to t=t5, the magnetic element 220 may be understood as accelerating in the positive x direction in response to the positive current in the coil.

From time t=t5 to t=t8, a current of opposite polarity is applied, e.g., as commanded by the current control block 218. This change in current will be accompanied by a corresponding change in the magnetic field present in the tube 210. Responsive thereto, the magnetic element 220 is seen to experience negative acceleration in FIG. 3C from t=t5 to t=t8, while continuing to move right from x=x1, to a rightmost extreme of x=x7 at t=t7 in FIG. 3B. At t=t7, the magnetic element 220 reverses direction and begins traveling in the negative x direction due to the continued force being applied in the negative x direction. From t=t7 to t=t8, the magnetic element continues moving in the negative x direction until it once again returns to x=x1 at t=t8.

In the exemplary embodiment shown, the magnitude of the negative acceleration from t=t6 to t=t8 is less than the magnitude of acceleration from t=t2 to t=t4, thereby causing the user to feel a net directional impulse in the positive x direction. In general, it will be appreciated that such a directional impulse will be produced if the maximum acceleration of the magnetic element in one direction is greater than the maximum acceleration of the magnetic element in the other direction. Furthermore, it will be appreciated that the waveform from t=t1 to t=t8 in FIG. 3A may be considered to form a single cycle, and may be repeated over multiple cycles to produce a periodic series of directional impulses if desired.

While an exemplary current profile for only one of the coils 240, 241, and 242 is shown in FIG. 3A, one of ordinary skill in the art will appreciate that a composite current profile may be generated by simultaneously controlling independent current profiles of all of the coils 240, 241, and 242 for the mechanism 200. For example, multiple coils may be distributed along the axis of the tube 210 as shown in FIG. 2A, and independently switched in sequence to allow finer control of the displacement profile of the magnetic element 220 over the axis of the tube 210. It will be further appreciated that in alternative exemplary embodiments, fewer or more than the three coils shown in FIG. 2 may readily be accommodated. Such alternative exemplary embodiments are contemplated to be within the scope of the present disclosure.

From FIGS. 3A, 3B, and 3C, it will be appreciated that by actively controlling the current profile over a specific time interval, the displacement profile of the magnetic element 220 may be correspondingly controlled over such time interval. Conversely, changes in the displacement of the magnetic element 220 not due to active current control (e.g., movement of the magnetic element 220 due to user movement, jostling, etc.) may induce currents in the coil or coils according to Faraday's law of induction. In an exemplary embodiment, current in the coil(s) generated by movement of the magnetic element 220 due to such other physical forces may be harvested for energy, as further described hereinbelow.

Figure 4A:
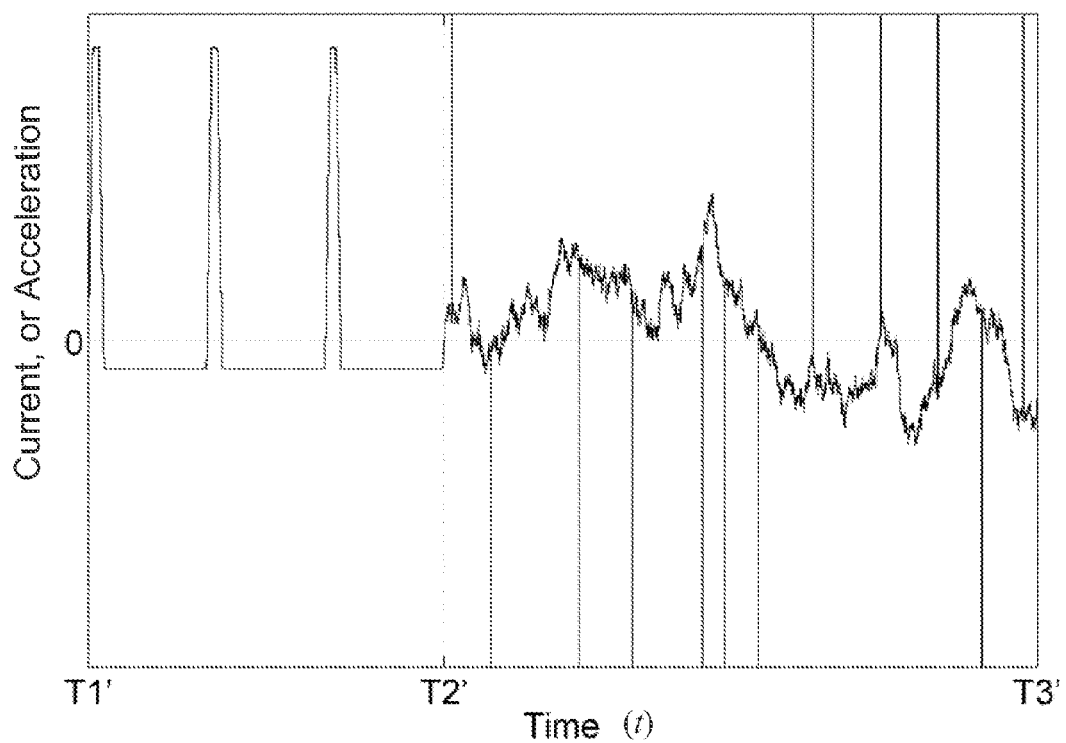
FIGS. 4A, 4B, and 4C illustrate alternative exemplary current, displacement and velocity profiles for the mechanism of FIG. 2.
Figure 4B:
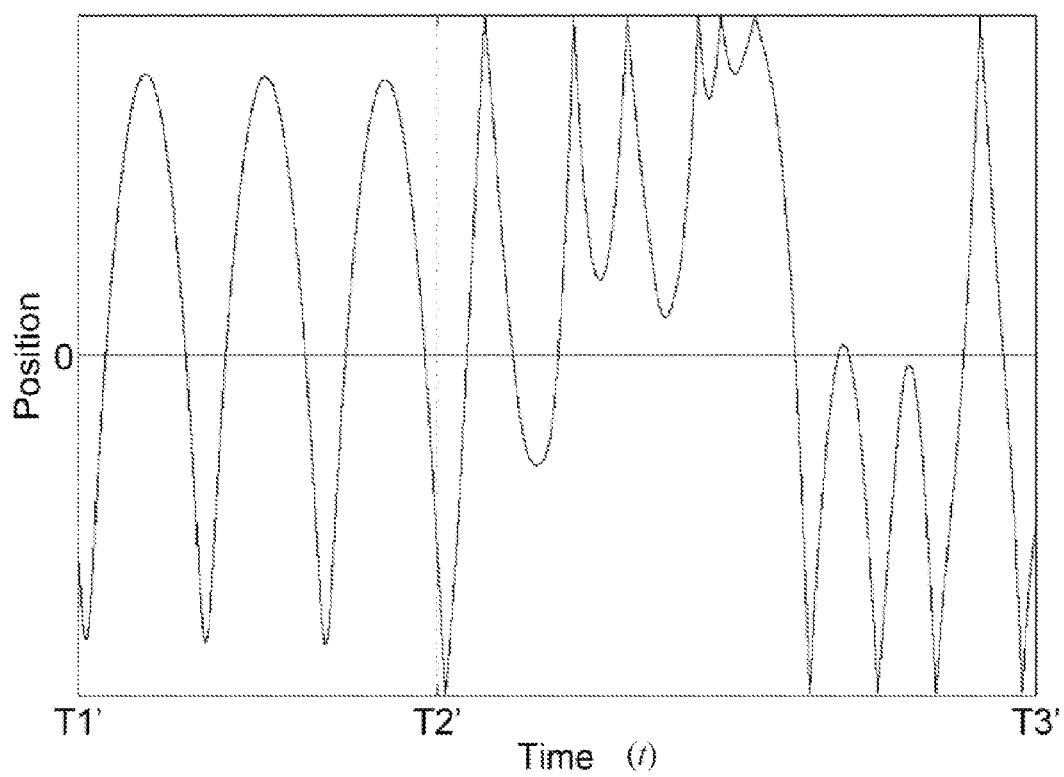
Figure 4C:
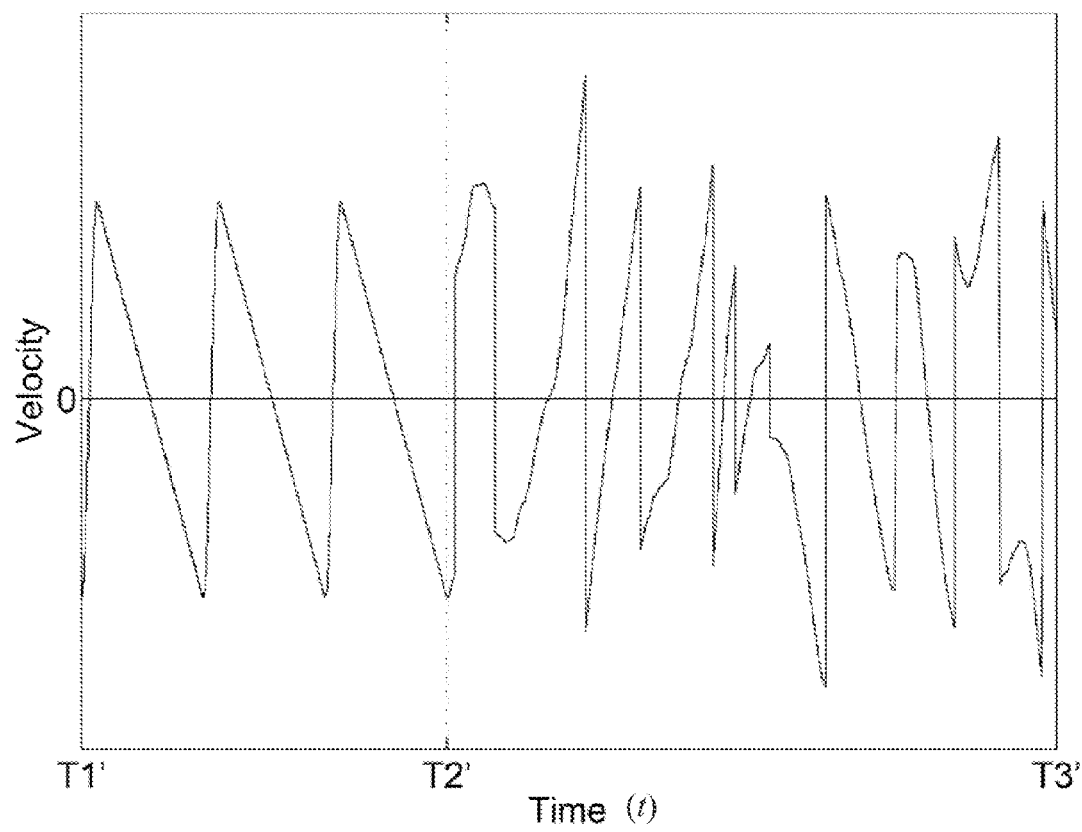

FIGS. 4A, 4B, and 4C illustrate alternative exemplary current, displacement, and velocity profiles for the mechanism 200 of FIG. 2. Again, it will be appreciated that FIGS. 4A, 4B, and 4C are shown for illustrative purposes only, and are not meant to limit the scope of the present disclosure to any particular current and/or displacement profiles shown.

In FIGS. 4A, 4B and 4C, from time t=T1' to t=T2', current through the coil shown is actively controlled by the current control block 218, and current generated by the magnetic element 220 due to other forces is assumed to be negligible. This time interval is also denoted as an "active" interval. During the active interval, variations in the displacement profile of the magnetic element 220 as shown in FIG. 4B are largely caused by the active generation of current by the current control block 218.

From time t=T2' to t=T3', current through the coil shown is not actively controlled by the current control block 218, and other forces on the magnetic element 220 are assumed to cause the variations in coil current shown. This time interval is also denoted as a "passive" interval. During the passive interval, the current profile of the magnetic element 220 as shown in FIG. 4A is caused by variations in the displacement profile of the magnetic element 220 as shown in FIG. 4B.

In an exemplary embodiment, variations in the coil current during the passive interval may be harvested for energy using, e.g., a harvesting mechanism in the current control block 218 such as further described with reference to FIG. 5.

Figure 5:
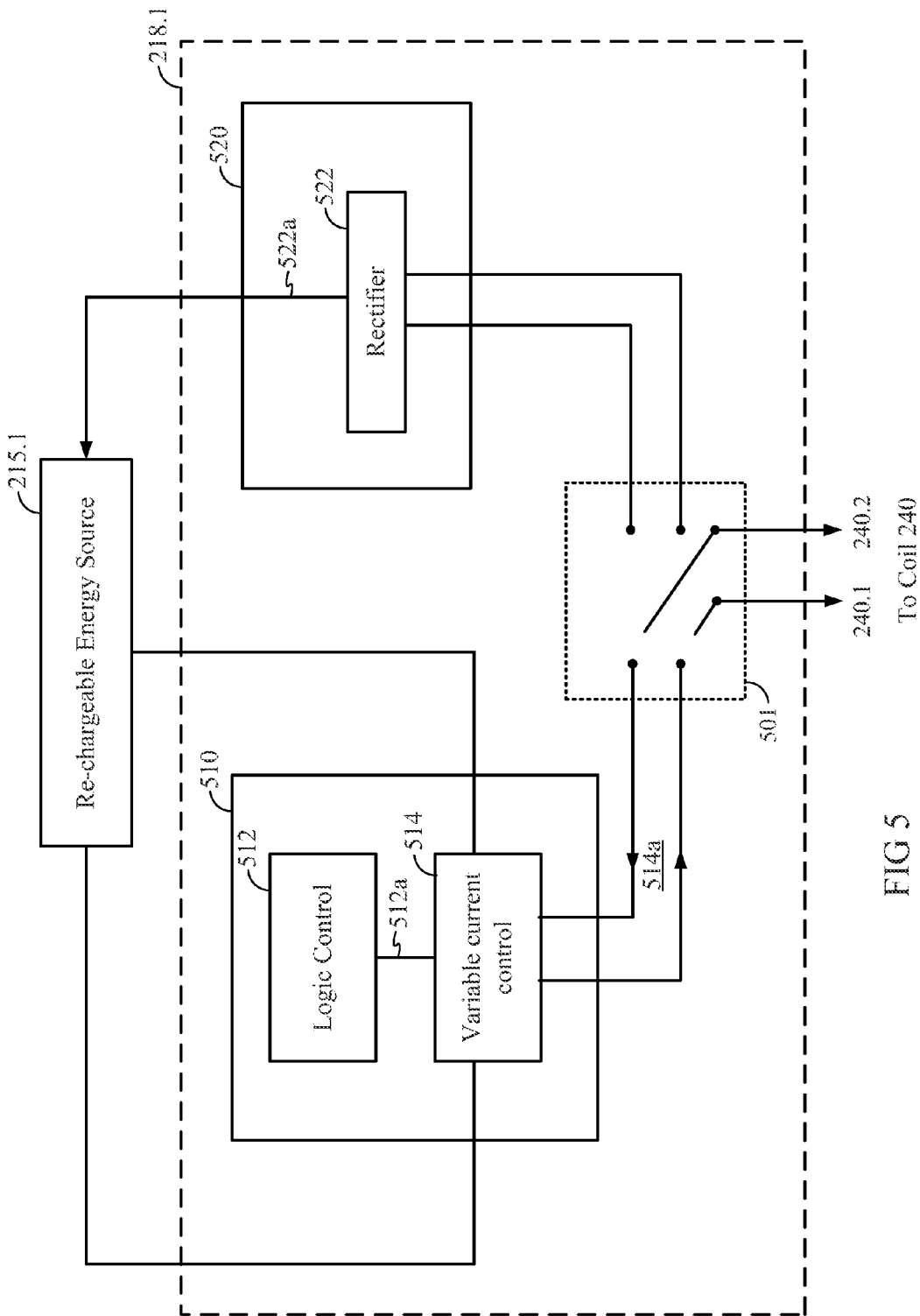
FIG. 5 illustrates exemplary embodiments of a current control block and energy source that can alternately generate a desired current profile during active intervals, as well as harvest energy from a current profile during passive intervals.

FIG. 5 illustrates exemplary embodiments of a current control block 218.1 and energy source 215.1 that can both generate a desired current profile during active intervals, as well as harvest energy from current during passive intervals.

In FIG. 5, the block 218.1 includes a dual-terminal switching element 501 that selectively couples the ends 240.1 and 240.2 of a coil 240 to either an active current generation block 510 during active intervals, or to a harvesting circuit 520 during passive intervals. It will be appreciated that the harvesting circuit 520 may be configured to harvest electrical energy from the kinetic energy of the magnetic element 220 during passive intervals, and charge the re-chargeable energy source 215.1 with the harvested electrical energy. While the switching element 501 is shown as switching only ends 240.1 and 240.2 for the first coil 240, it will be appreciated that a switching element may also readily accommodate additional coils 241, 242, as well as other coils not explicitly shown, according to the present disclosure.

It will be appreciated that the symbol denoting the switching element 501 in FIG. 5 is used only to illustrate the function of the switching element 501, and is not meant to limit the scope of the present disclosure to any particular implementation of a switching element. One of ordinary skill in the art will appreciate that there are a variety of ways in which such a switching element may be implemented, e.g., mechanically, or electronically using transistors and/or other circuit elements, etc. Such exemplary embodiments are contemplated to be within the scope of the present disclosure.

The active current generation block 510 includes a logic control unit 512 for generating a digital representation 512a of a desired current profile for the coil 240 during active intervals. The digital representation 512a is coupled to a variable current control block 514, which may convert the digital representation 512a of the desired current to an analog current 514a, which is subsequently provided to the coil 240. During active intervals, power is drawn from the re-chargeable energy source 215.1 through circuitry controlled by the variable current control block 514 to drive the coil 240 with the analog current 514a.

In an exemplary embodiment, the variable current control block 514 may be implemented using, e.g., a pulse-width modulation circuit for generating a current whose short-term average value corresponds to the desired current. In alternative exemplary embodiments, the variable current control block 514 may also include, e.g., a digital-to-analog converter (DAC). One of ordinary skill in the art will appreciate that there are a plurality of techniques for generating an analog current according to a digitally specified profile, and such exemplary embodiments are contemplated to be within the scope of the present disclosure.

During passive intervals, the harvesting circuit 520 harvests electrical energy from the coil. In FIG. 5, the charging circuit is shown as including a rectifier 522 that rectifies current from the coil 240 to generate an output voltage. In an exemplary embodiment, the rectifier 522 may be a bi-directional rectifier known in the art capable of rectifying both positive and negative currents. The output voltage 522*a* may be used to charge the energy source 215.1. Thus during passive intervals, energy is supplied to the re-chargeable energy source 215.1. The energy source 215.1 may be any re-chargeable energy source known in the art, e.g., a re-chargeable battery, a capacitor, etc.

It will be appreciated that in alternative exemplary embodiments, the harvesting circuit 520 may be implemented using any structures known to one of ordinary skill in the art to perform the functions described. For example, the harvesting circuit 520 may alternatively include a voltage up-converter known in the art to generate an output voltage for the energy source 215.1. Such alternative exemplary embodiments are contemplated to be within the scope of the present disclosure.

It will further be appreciated that the re-chargeable energy source 215.1 may also be used to supply energy to modules of a handheld device 100 other than the mechanism 200 for generating directional force impulses. In an exemplary embodiment wherein the current control block 218.1 and re-chargeable energy source 215.1 are utilized in the force impulse generation mechanism 200, the mechanism 200 provides the benefits of both directional impulse generation as well as energy harvesting, which may advantageously extend the overall battery life of the handheld device 100.

Note FIG. 5 is shown for illustrative purposes only, and is not meant to limit the scope of the present disclosure to any particular implementations of the blocks shown. For example, in alternative exemplary embodiments, a mechanism 200 need not incorporate energy harvesting capabilities of the exemplary embodiment shown in FIG. 5. Such alternative exemplary embodiments are contemplated to be within the scope of the present disclosure.

Figure 6A:
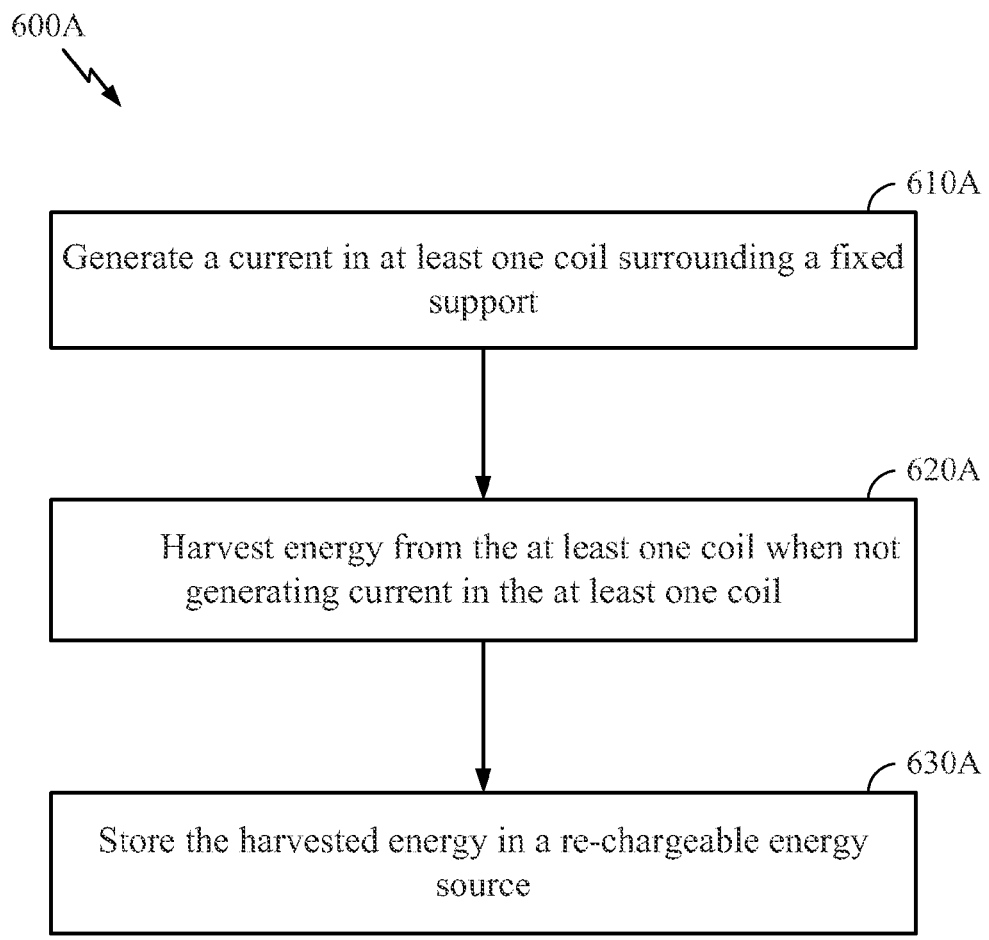
FIGS. 6A and 6B illustrate exemplary embodiments of methods for operating a mechanism incorporating the capabilities shown in FIG. 5.
Figure 6B:
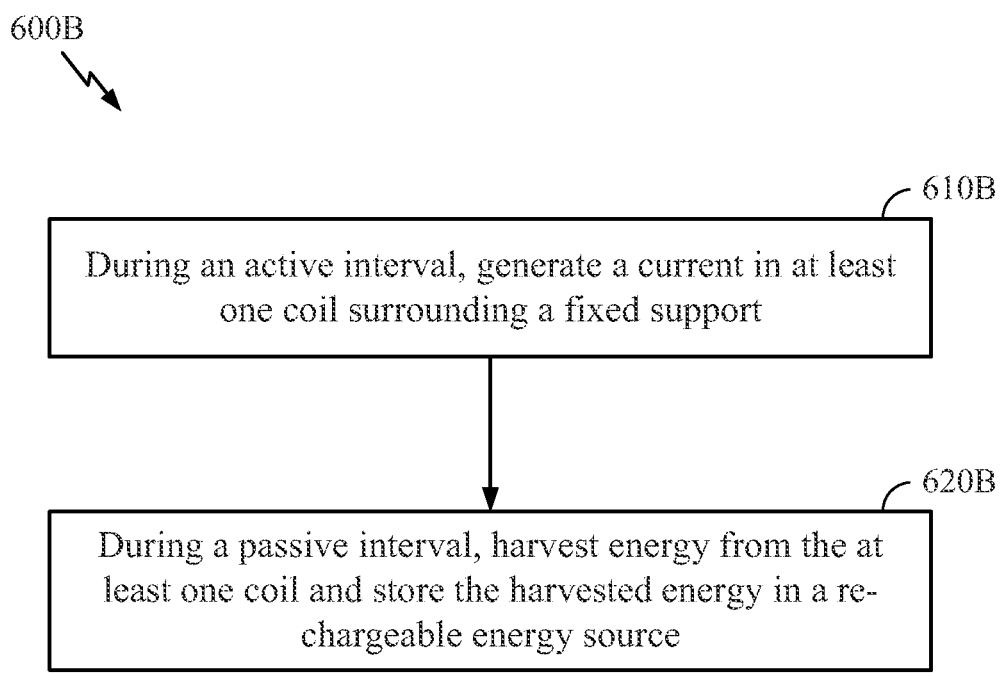

FIGS. 6A and 6B illustrate exemplary embodiments of methods according to the present disclosure.

In FIG. 6A, at block 610A, the method 600A includes generating a current in at least one coil surrounding a fixed support. In an exemplary embodiment, the support is coupled to a magnetic element movable along a first axis of the support. The current may cause the magnetic element to move along the first axis such that, over at least one cycle, the maximum acceleration of the magnetic element in one direction along the first axis is greater than the maximum acceleration of the magnetic element in the other direction along the first axis.

At block 620A, the method includes harvesting energy from the at least one coil when not generating current in the at least one coil.

At block 630A, the method includes storing the harvested energy in a re-chargeable energy source.

In FIG. 6B, at block 610B, the method 600B includes, during an active interval, generating a current in at least one coil surrounding a fixed support. In an exemplary embodiment, the support is coupled to a magnetic element movable along a first axis of the support, and the current causes the magnetic element to move along the first axis.

At block 620B, during a passive interval, the method includes harvesting energy from the at least one coil and storing the harvested energy in a re-chargeable energy source.

Figure 7:
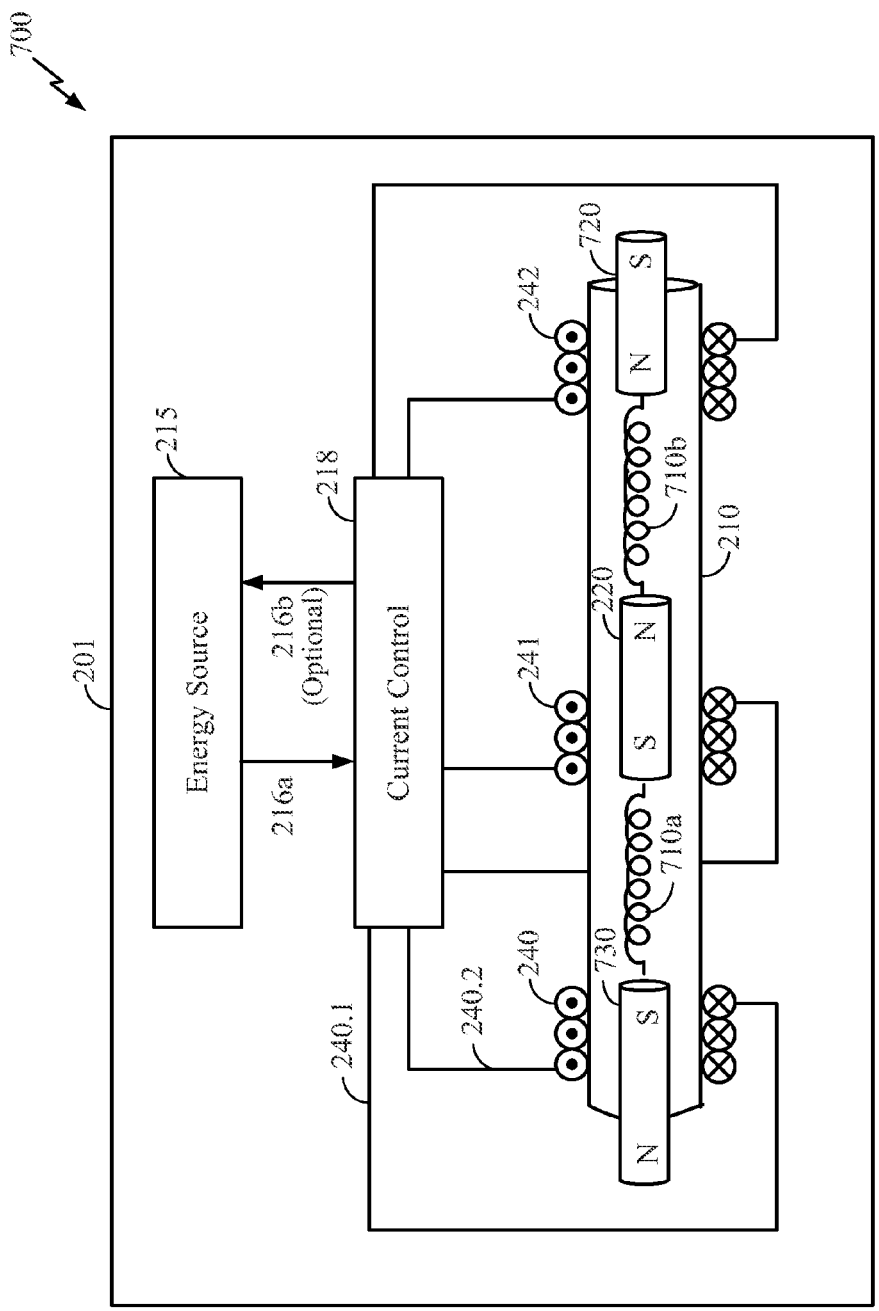
FIG. 7 illustrates an alternative exemplary embodiment of a mechanism for generating directional impulses according to the present disclosure.

FIG. 7 illustrates an alternative exemplary embodiment 700 of a mechanism for generating directional impulses according to the present disclosure. As shown in FIG. 7, one or more auxiliary magnets 720, 730 may be provided at the ends of the tube 210. For example, the auxiliary magnet 720 may be physically fixed at one end of the tube 210, and the auxiliary magnet 730 may be physically fixed at the other end. The polarity of the auxiliary magnet 720 may be chosen such that it repels the closer end of the magnetic element 220, and similarly for auxiliary magnet 730. For example, the north pole (N) of the auxiliary magnet 720 is oriented toward the north pole (N) of the magnetic element 220, while the south pole (S) of the auxiliary magnet 730 is oriented toward the south pole (S) of the magnetic element 220. In this manner, whenever the magnetic element 220 approaches the auxiliary magnet 720, a repulsive force will be generated between the magnets 220 and 720 that will push the magnetic element 220 back towards its initial position.

FIG. 7 further illustrates that one or more biasing springs 710*a*, 710*b* may be provided. One end of the biasing spring 710*a* is attached to the magnetic element 220, while another end is attached to one end of the tube, e.g., to one end of the magnet 730. Similarly, one end of the biasing spring 710*b* is attached to the magnetic element 220, while another end is attached to another end of the tube, e.g., to one end of the magnet 720. It will be appreciated that the biasing springs 710*a*, 710*b* may generate forces to pull and push the magnetic element 220 back to an initial position whenever it is displaced.

In an alternative exemplary embodiment, a single magnet may be provided at the center of the tube 210 to bias the magnetic element 220 towards the center. For example, a ring magnet may be wrapped around the circumference of the tube 210 near its center (e.g., x=0 according to FIG. 2). Such alternative exemplary embodiments are contemplated to be within the scope of the present disclosure.

By providing one or more biasing springs and/or one or more auxiliary magnets as described in FIG. 7, the mechanism 700 may require the current control block 218 to generate less current in the coils 240, 241, and 242 to bring the magnet back to its initial position, thus reducing power consumption and/or the complexity of the control method.

It will be appreciated that in certain exemplary embodiments, the one or more auxiliary magnets need not be employed in conjunction with the one or more biasing springs, and either feature can be incorporated independently of the others. In alternative exemplary embodiments, the magnetic element 220 may specifically incorporate a non-magnetic mass (not shown) to increase the total mass of the magnetic element 220, such that the directional force impulse generated may be more clearly felt by the user. For example, such non-magnetic mass may be a battery of the handheld device 100. In alternative exemplary embodiments, more than one magnetic element 220 may also be incorporated. Such alternative exemplary embodiments are contemplated to be within the scope of the present disclosure.

Figure 8:
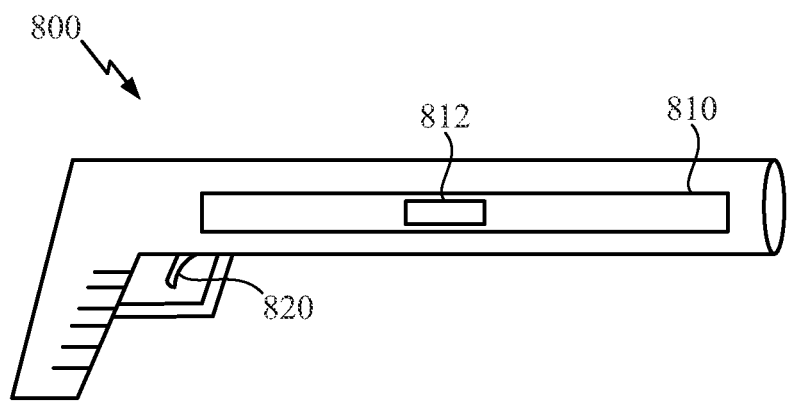
FIG. 8 is a drawing illustrating a game controller in a shape representing a gun for providing force feedback according to one embodiment.

The above disclosed motion induction techniques may be used in gaming controllers for generating forces perceptible to the user. According to one embodiment, the motion induction techniques are used in a non-anchored gaming controller. FIG. 8 is a drawing illustrating a game controller in a shape representing a gun for providing force feedback according to one embodiment. A game controller 800 is shaped to represent a gun. The game controller 800 may be used, for example, during hunting games. The game controller 800 includes a motion induction device 810 having a mass 812. According to one embodiment, the mass 812 is untethered from the game controller 800. The mass 812 is accelerated and decelerated by the game controller 800 to generate force feedback in the game controller 800. According to one embodiment, the game controller 800 is twelve inches long and has a mass 812 with a diameter of one half inch to generate approximately 18 pounds of force.

According to one embodiment, the force feedback provided by the motion induction device 810 simulates recoil resulting from a gun shot. For example, after the user pulls a trigger 820 of the game controller 800, the mass 812 is accelerated to produce a recoil feedback. The mass 812 may be decelerated shortly after acceleration to prevent collision of the mass 812 with either end of the motion induction device 810. The timing of the acceleration and deceleration of the mass 812 may be controlled by the game controller 800 to provide realistic force feedback. In another embodiment, the mass 812 contacts an object in the motion induction device 810 and generate an audible sound for feedback to the user.

According to one embodiment, a potentiostat (not shown) is added to the game controller 800. The potentiostat allows the force feedback provided by the motion induction device 810 to be scaled. The potentiostat may have a user adjustable switch or screw. Alternatively, the potentiostat may be adjusted by a mechanism (not shown) inside the game controller 800.

Figure 9:
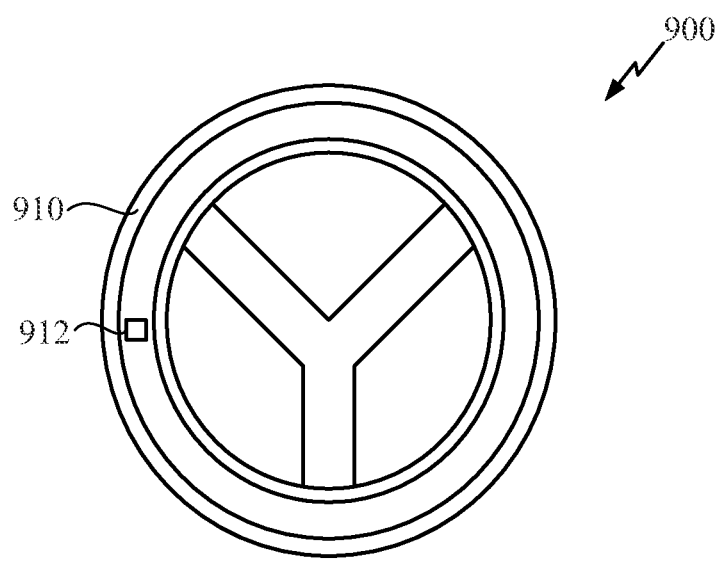
FIG. 9 is a drawing illustrating a game controller in a shape representing a steering wheel providing force feedback according to one embodiment.

Other game controllers may include the motion induction device for providing force feedback. FIG. 9 is a drawing illustrating a game controller in a shape representing a steering wheel providing force feedback according to one embodiment. A game controller 900 is shaped to represent a steering wheel. The game controller 900 may be used, for example, in car racing games. The game controller 900 includes a motion induction device 910 having a mass 912. The mass 912 may be accelerated and decelerated by the motion induction device 910 to generate force feedback. According to one embodiment, a single motion induction device may span the entire circumference of the game controller 900. That is, a single motion induction device may be shaped as a circle. According to another embodiment, multiple motion induction devices are placed in a serial fashion throughout the game controller 900. Circular motion provided by the motion induction device 910 allows the user of the game controller 900 to feel only acceleration and no impact or deceleration.

According to one embodiment, the game controller 900 provides directional feedback to the user during game play. For example, the game controller 900 may provide a force in the left or right direction to suggest to the user the force in response to turning the wheel in the race course. As another example, the game controller 900 may provide a force in the left or right direction in response to collision with an object, such as another car or a wall.

Figure 10:
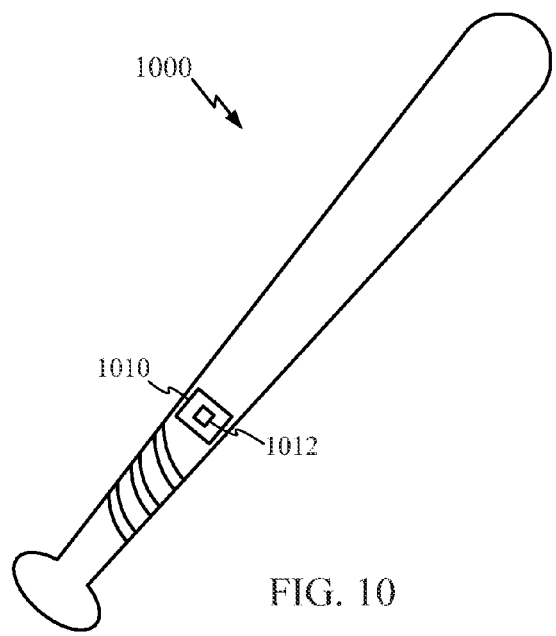
FIG. 10 is a drawing illustrating a game controller in a shape representing a baseball bat providing force feedback according to one embodiment.

FIG. 10 is a drawing illustrating a game controller in a shape representing a baseball bat providing force feedback according to one embodiment. A game controller 1000 is shaped to represent a baseball bat. The game controller 1000 may be used, for example, in baseball sport games. The game controller 1000 includes a motion induction device 1010 having a mass 1012. The mass 1012 may be accelerated and decelerated by the motion induction device 1010 to generate force feedback.

According to one embodiment, the game controller 1000 provides directional feedback to the user during gameplay. For example, the game controller 1000 may provide a force simulating striking a ball with a baseball bat. According to another embodiment, a group of motion induction devices (not shown) may provide force feedback to the user in different directions in different regions of the game controller 1000 to simulate striking a ball in different areas of a baseball bat.

Figure 11A:
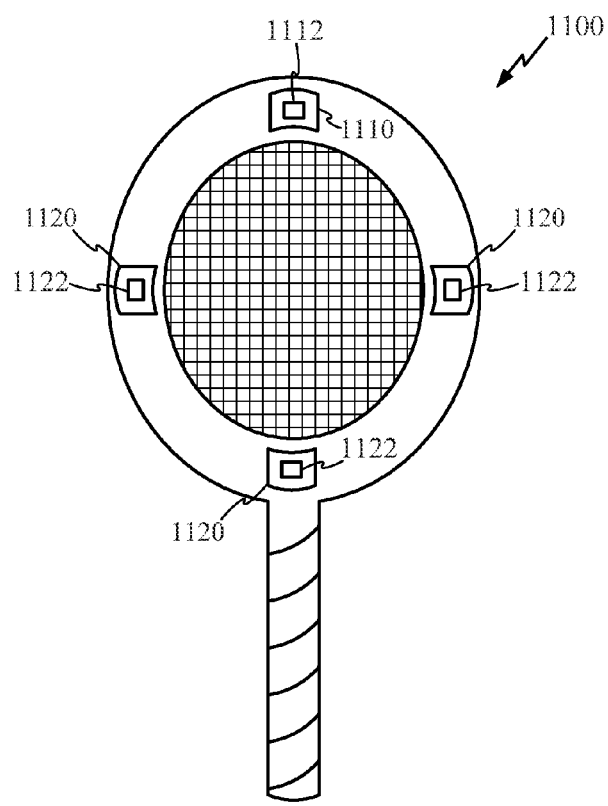
FIGS. 11A and B are drawings illustrating a game controller in a shape representing a racket according to one embodiment.
Figure 11B:
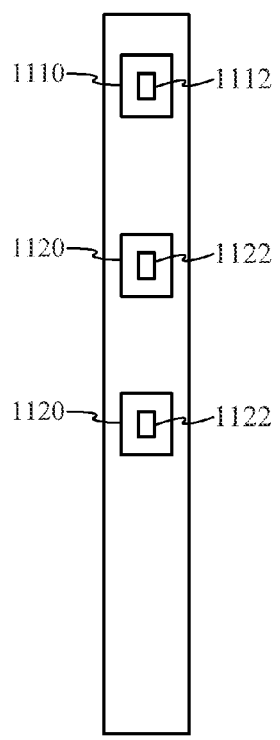

FIGS. 11A and 11B are drawings illustrating a game controller in a shape representing a racket according to one embodiment. A game controller 1100 is shaped to represent a racket. The game controller 1100 may be used, for example, in tennis games or badminton games. The game controller 1100 includes a motion induction device 1110 having a mass 1112. The mass 1112 may be accelerated and decelerated by the motion induction device 1110 to generate force feedback. In one embodiment, other motion induction devices 1120 having another mass 1122 are also provided.

According to one embodiment, the game controller 1100 provides directional feedback to the user during gameplay. For example, the game controller 1100 may simulate the striking of a tennis ball with a tennis racket. If the user swings the game controller 1100 imperfectly, the motion induction devices 1110, 1120 will provide twist feedback to the game controller 1100 to simulate impact of a tennis ball off-center of a tennis racquet. The twisting could result from multiple coils affecting a single mass and could occur simultaneously with directional motion. According to other embodiments, torque provided by the motion induction devices 1110, 1120 can generate other types of force feedback.

Figure 12:
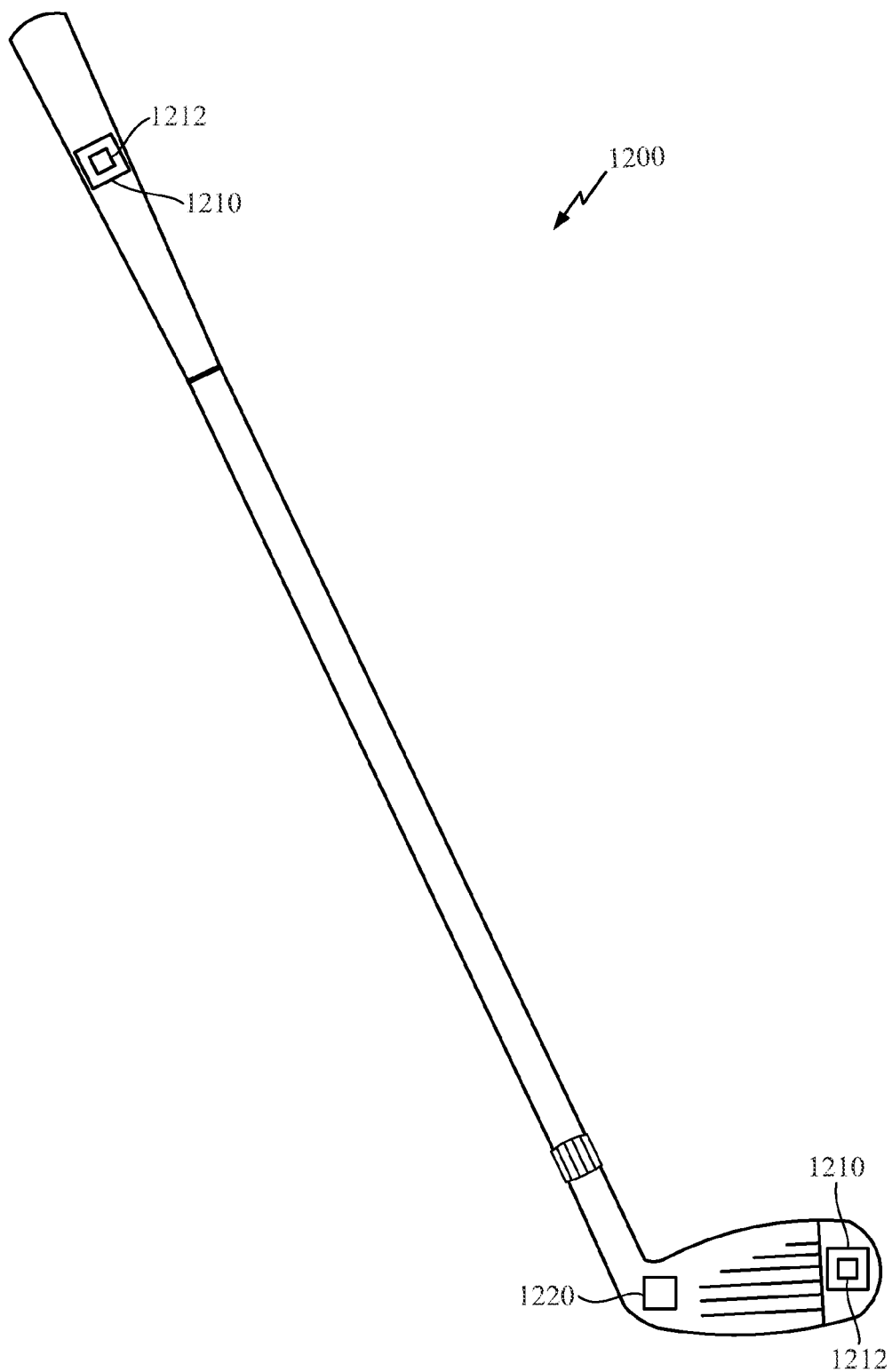
FIG. 12 is a drawing illustrating a game controller in a shape representing a golf club according to one embodiment.

FIG. 12 is a drawing illustrating a game controller in a shape representing a golf club according to one embodiment. A game controller 1200 is shaped to represent a golf club. The game controller 1200 may be used, for example, in golf sporting games. The game controller 1200 includes a motion induction device 1210 having a mass 1212. The mass 1212 is accelerated and decelerated by the motion induction device 1210. to generate force feedback.

The game controller 1200 may also include a sensor 1220. According to one embodiment, the sensor 1220 is an accelerometer. The sensor 1220 may provide information to the game controller 1200 for determining operation of the motion induction device 1210. For example, the sensor 1220 may determine an orientation of the game controller 1200 to determine a direction of force feedback to provide to the user. As another example, the sensor 1220 may provide information to the game controller 1200 about motion experienced by the game controller 1200. According to one embodiment, the sensor 1220 measures the speed and motion of a golf swing, and the game controller 1200 provides force feedback through the motion induction device 1210 to suggest a motion and speed for a golf swing. In this manner, the game controller 1200 may be used to train users in sporting events. In some embodiments, the motion induction device 1210 provides feedback based on information from the sensor 1220. In other embodiments, the motion induction device 1210 provides feedback in anticipation of a user's movement of the game controller 1200. Although a sensor is not shown in the embodiments of FIG. 8-11, a sensor could also be employed in the devices described with respect to those embodiments.

Figure 13:
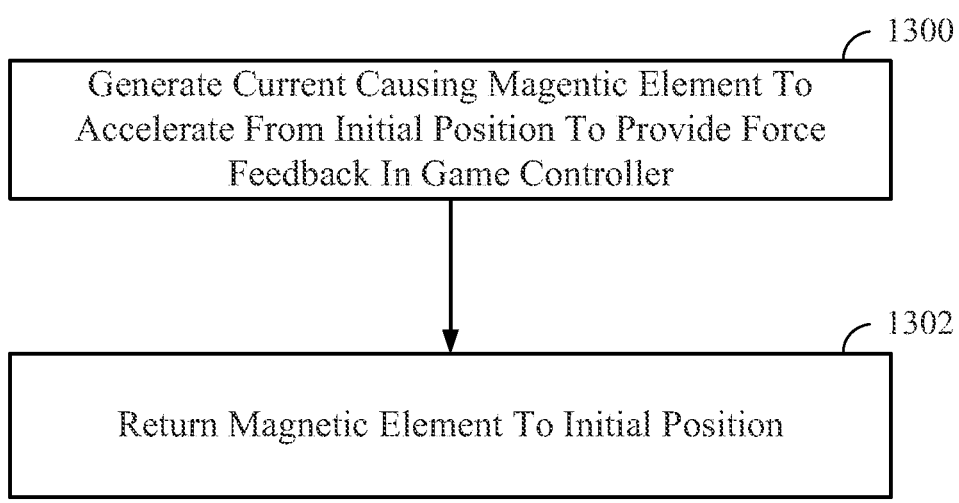
FIG. 13 is a drawing illustrating an exemplary flow chart of a method according to one embodiment.

Referring now to FIG. 13, a method of causing force feedback in a game controller is explained. At block 1300 a current is generated in a coil wrapped around an enclosure. The enclosure has a magnetic element movable along a first axis of the enclosure. The current causes the magnetic element to accelerate along the first axis away from an initial position to provide force feedback in a gaming controller to simulate an event. At block 1302, subsequent to generating the current, the magnetic element is caused to move back toward the initial position along the first axis.

Linear induction devices provide directional force feedback to users. The directional force feedback improves a user's experience during gameplay. Additionally, game controllers with linear induction devices have reduced power consumption and lower cost compared with vibration motors. Additionally, the linear induction devices provide force feedback without anchoring the game controller.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the disclosure.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A gaming controller, comprising:
    a chassis;
    a motion induction device fixedly coupled to the chassis, the motion induction device providing force feedback for the gaming controller;
    a magnetic element movably positioned within the motion induction device, the magnetic element being movable along a first axis of the motion induction device;
    at least one conducting coil wrapped around the motion induction device; and
    a current control block coupled to the at least one conducting coil, the current control block being configurable to generate current through the at least one conducting coil to move the magnetic element along the first axis.

2. The gaming controller of claim 1, in which the force feedback provided is directional.

3. The gaming controller of claim 1, further comprising a sensor for providing at least one of motion, speed, and orientation information to the gaming controller, the information being used to adjust the force feedback.

4. The gaming controller of claim 1, in which the gaming controller is a baseball bat.

5. The gaming controller of claim 1, in which the gaming controller is a tennis racquet.

6. The gaming controller of claim 1, in which the gaming controller is a golf club.

7. The gaming controller of claim 1, in which the gaming controller is a gun.

8. The gaming controller of claim 1, in which the gaming controller is a steering wheel.

9. The gaming controller of claim 1, further comprising a potentiostat for adjusting an amplitude of the force feedback.

10. A method, comprising:
generating a current in a coil wrapped around an enclosure, the enclosure comprising a magnetic element movable along a first axis of the enclosure, the current causing the magnetic element to accelerate along the first axis away from an initial position to provide force feedback in a gaming controller to simulate an event; and
subsequent to the generating the current, causing the magnetic element to move back toward the initial position along the first axis.

11. The method of claim 10, in which the force feedback comprises at least one of simulating recoil in a gun, simulating a vehicle collision, and simulating a turn of a vehicle.

12. The method of claim 10, in which the force feedback comprises at least one of simulating a hit on a baseball bat, simulating a strike of a golf ball, and simulating a strike of a tennis ball.

13. The method of claim 10, further comprising:
receiving information from a sensor in the gaming controller; and
adjusting the force feedback provided in the gaming controller based on the received information.

14. The method of claim 10, further comprising:
receiving input from a potentiostat; and
adjusting an amplitude of the force feedback based on the received potentiostat input.

15. A gaming controller, comprising:
a chassis;
means for providing force feedback for the gaming controller, the providing means being fixedly coupled to the chassis;
at least one conducting coil wrapped around the providing means; and
a current control block coupled to the at least one conducting coil, the current control block being configurable to generate current through the at least one conducting coil to move an untethered magnetic mass movably positioned within the gaming controller.

16. The gaming controller of claim 15, further comprising a sensor for providing at least one of motion, speed, and orientation information to the gaming controller, in which the information is used to adjust the force feedback.

17. The gaming controller of claim 15, in which the gaming controller is at least one of a baseball bat, a tennis racquet, a golf club, a gun, and a steering wheel.

18. The gaming controller of claim 15, further comprising a potentiostat for adjusting an amplitude of the force feedback.

19. A non-transitory computer readable medium tangibly storing a computer program for a game controller, comprising:
a sensing code segment that receives information from the game controller; and
a force feedback code segment that instructs force feedback in a motion induction device of the game controller based on the received information, the motion induction device comprising a magnetic element movably positioned within the motion induction device.

20. The computer readable medium of claim 19, in which the received information is at least one of motion, speed, and orientation of the game controller.

* * * * *